Figure 1:
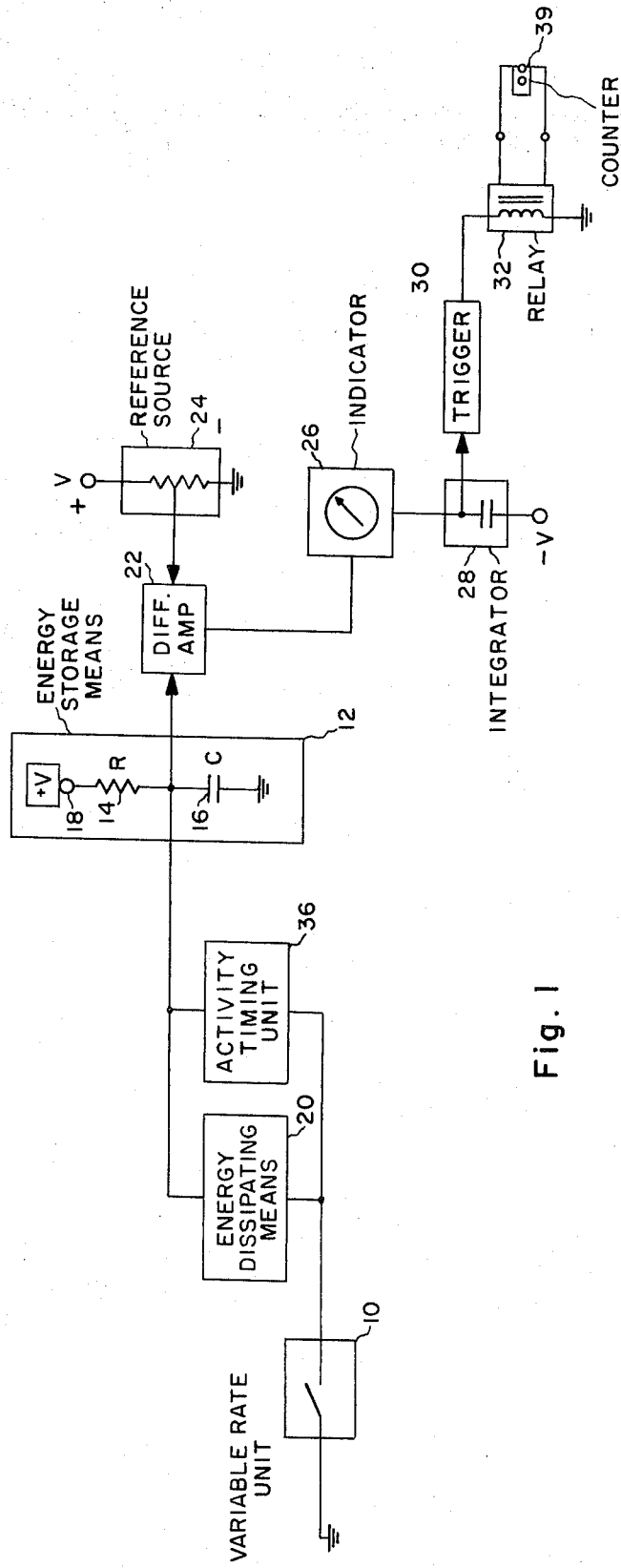

United States Patent [19]
Hagen

[11] 3,781,677
[45] Dec. 25, 1973

[54] VARIABLE RATE MEASURING DEVICE

[75] Inventor: Thomas E. Hagen, Saugerties, N.Y.

[73] Assignee: Frederick S. Zipser, M.D., Red Hook, N.Y.

[22] Filed: Jan. 19, 1972

[21] Appl. No.: 218,973

[52] U.S. Cl.............. 324/78 R, 324/168, 324/189, 324/78 E
[51] Int. Cl.......................... G01r 23/02, G04f 9/00
[58] Field of Search .............. 324/78 E, 78 J, 78 R, 324/168, 180, 189

[56] References Cited
UNITED STATES PATENTS
3,611,343 10/1971 Schoenbach................... 324/189 X
3,580,083 5/1971 Zipser.............................. 73/432 R
3,535,658 10/1970 Webb........................... 328/140 X Primary Examiner—Alfred E. Smith
Attorney—Daniel M. Rosen

[57] ABSTRACT

A variable rate measuring device is provided for accurately measuring the rate in which a series of input signals are provided. The device operates by means of an energy storage RC network which is repeatedly discharged by means of a constant current source energized by the variable rate signal. The net storage level is detected at an input of a differential amplifier, compared with the reference signal, and the difference indicated on a meter. Means are also provided for accumulating the varying rate signal over a period of time for providing a totalized count indicative thereof.

11 Claims, 2 Drawing Figures

VARIABLE RATE MEASURING DEVICE

This invention relates to variable rate measuring devices and particularly to a device for accurately indicating and totalizing a variable rate signal received over a period of time.

The variable rate measuring devices find utility in many areas. This particular invention finds applicability in the field of work or energy measuring devices wherein the input is derived from a series of varying rate pulses. It is known for example from U.S. Patent 3,580,083 that work expended by an individual running in place can be determined by an analysis dependent upon the number of steps taken by the individual per unit of time and the length of time that each foot is on the ground, or its reciprocal, the length of time that each foot is off the ground, and the total length of time that the person has taken running in place. It is furthermore disclosed in said U.S. Pat. No. 3,580,083 that the relationship between work or energy expended in the sense of the extent of employment of cardiovascular facility will remain proportional to the factor of number of steps per minute and the effort expended per step. The amount of work done proportional to the foot time up or down and the number of steps taken per unit time are actual factors taken into account for measurement of this work energy.

As a practical matter, therefore, it is desirable to provide a circuit for accurate measurement of varying rate inputs produced by a person running in place in accordance with the foregoing relationships in order to provide an output properly indicative of the energy expended. It is necessary to accomplish the foregoing function with a high degree of accuracy while at the same time maintaining a certain economy of cost and the reliability of function.

It is, therefore, the principle object of the foregoing invention to provide a variable rate measuring device which will operate in a novel and unique manner to provide an accurate indication of the variable rate input.

It is a further object of this invention to provide a variable rate measuring device which will provide an accurate indication of the variable rate measuring input while maintaining an economy of cost along with accuracy.

It is still a further object of the invention to provide a variable rate measuring device as described above with provisions for integrating the output to provide a totalizer function.

The foregoing objects are accomplished by a structure employing energy storage. Specifically, an energy storage means is provided along with an energizing means coupled to the energy storage means. Further means for applying the variable rate signal are provided and energy dissipating means having a linear dissipation characteristic is responsive to the variable rate signal for linearly dissipating energy from the energy storage means in accordance wih the variable rate signal. Means are then coupled to the energy storage means for indicating the net energy level of the energy storage means. An integrating device can be coupled to the last indicating means for summing or totalizing the final output signal. In this preferred embodiment, the energy storage means is a capacitor which when coupled with a specific resistance value will have a predetermined RC charging characteristic. The linear dissipation device is provided in the form of a constant current source which will control accurately the rate of discharge of the capacitor in accordance with the variable rate signal applied thereto. As a result of the linear discharge characteristic, an accurate means for indicating the net storage level on the capacitor as a function of the variable rate input signal is provided.

Figure 2:
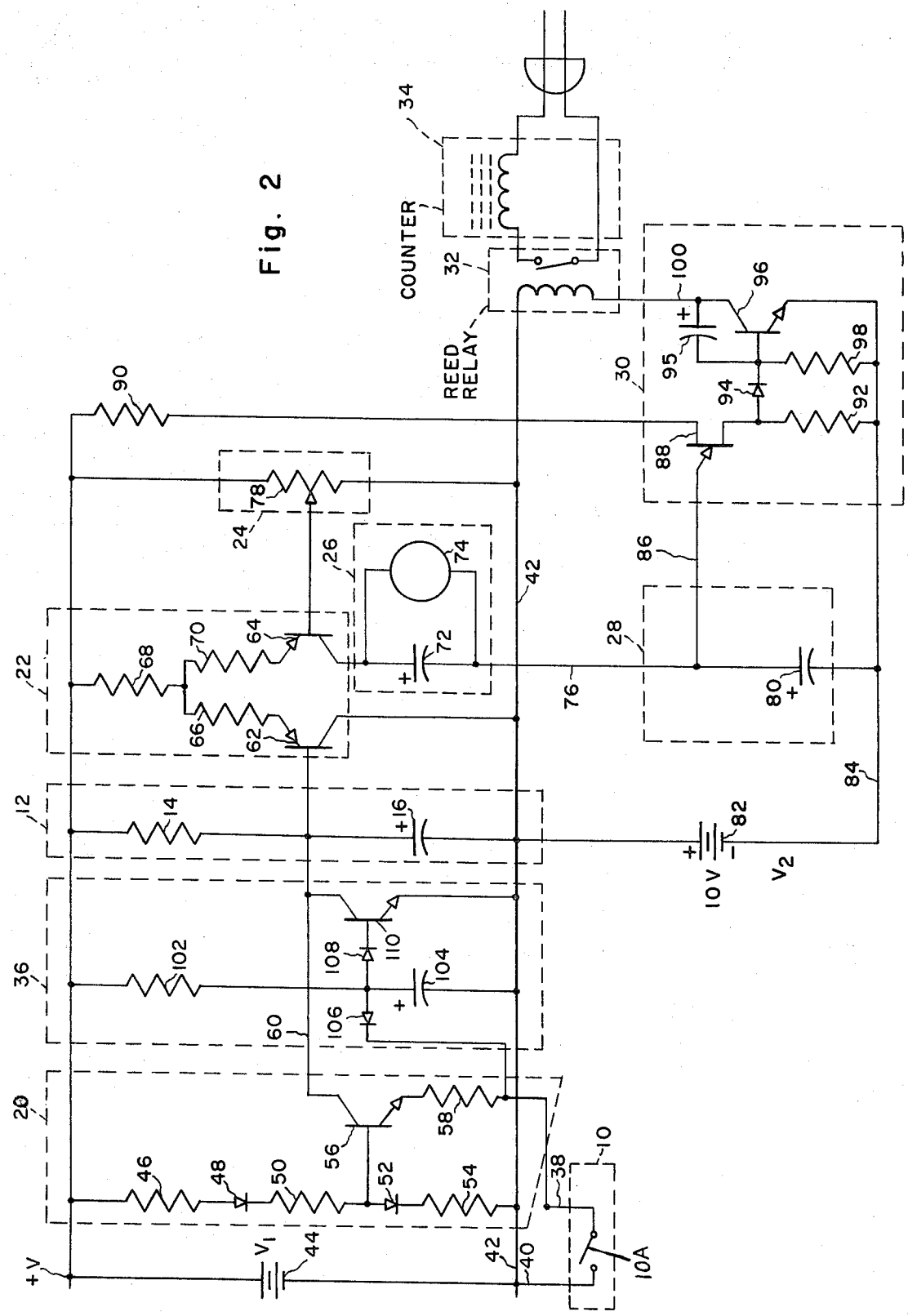

The foregoing objects and descriptions as well as further objects, advantages and features of the present invention will become more apparent from the following descriptions of various embodiments of the invention, taken in connection with the various Figures, wherein:

FIG. 1 is a generalized block diagram illustrating the principle of the invention, and FIG. 2 is a circuit diagram illustrating a specific circuit employed as a preferred embodiment of the invention.

Referring now to FIG. 1 a source of variable rate input pulses is indicated as 10. This source of variable input pulses in this particular application may be derived from the unit 10 indicated in FIG. 1 of U.S. Pat. No. 3,580,083, along the output line thereof. The term variable rate pulses is meant to imply a set of pulses having varying characteristics in terms of width duration. It should be noted the present invention is capable of measuring an output of a fixed rate pulse, the term variable rate implying only that a change in rate will produce a change in output as measured by the indicating device of the present invention.

The central portion of FIG. 1 shows an energy storage means 12 which as shown in preferred embodiment includes a resistance 14 and a capacitor 16 forming an RC circuit. The RC circuit is coupled between a source of potential 18 indicated as +V and ground. In operation, the RC circuit charges to the point where the capacitor 16 is charged, at the junction of the resistor 14 and the capacitor 16, to the potential +V of the source 18. Connected between the variable rate input device 10 and the energy storage means 12 is an energy dissipating means 20. The energy dissipating means is designed to possess a linear dissipation characteristic and by virtue of its coupling between the variable rate input device 10 and the energy storage means 12 serves upon activitation of the variable rate input device 10 to linearly discharge the capacitor 16 in accordance with the rate of occurrence of the pulses produced by the input device 10 and, therefore, to linearly dissipate energy from the energy storage means in accordance with that rate.

The net energy level of the capacitor 16, indicated by the potential of the junction of the resistor 14 and the capacitor 16 is coupled to an input of a differential amplifier 22. The differential amplifier 22 receives a reference signal from a reference source 24 which serves as a minimum level below which a signal appearing at the capacitor 16 will appear. The net output of the differential amplifier 22 is coupled to an indicating device 26 which provides a direct indication of the current flow through the differential amplifier 22 as a result of the net differential between the input represented by the voltage across the capacitor 16 and the reference source 24.

To totalize the effect of the indicated signal output received by the indicator 26, an integrator 28 is responsive to the rate signal received by the indicator 26. The totalizer which, in this preferred embodiment is a counter, is energized by virtue of a build up across the integrator providing a sufficient signal to the trigger unit 30 for energizing a relay 32 which in turn provides a drive pulse for a digital counter 34. The counter unit 34 may also include the relay circuit or be directly energizable by trigger impulses.

Also coupled across the energy dissipating device 20 is an activity timing unit 36. The function of the activity timing unit is as follows: It is evident that if the switching device within the variable rate input means 10 is left open for a long period of time the capacitor 16 will continue to charge up to its maximum level. During the course of normal operation it is not intended that this device should ever experience a capacitive charge level approaching that of maximum level since the variable rate input would keep the charge level of the capacitor 16 much below the maximum level. The activity timing device is, therefore, intended to operate as an override for high charge levels across the capacitor 16. In the event predetermined levels are exceeded, the activity timing device serves to provide an override signal which when coupled through the differential amplifier 20 results in the indicating device being turned off. This feature will be described in further detail below.

Referring now to FIG. 2 a more complete circuit diagram of the foregoing general principles illustrated in FIG. 1 is presented. By way of illustration, like reference numerals will be employed to indicate like component systems. Thus, the variable rate input device 10 is shown employing a set of leads 38 and 40 emerging therefrom. As explained above, the variable rate signal may be derived from any input but for the purposes of this utilization, the variable rate input signal device is operative by means of a foot switch 10A activated by an individual jogging in place as described more fully in the aforesaid U.S. Pat. No. 3,580,083. The lead 40 emerging from the variable rate input device 10 is coupled to a common or ground lead 42 while the other lead 38 is coupled to the discharge device 20. The discharge device 20 as shown consists of a constant current source. Energization for the circuit is provided by a positive bias $V_1$ source 44 which is coupled through the variable rate indicator to the constant current source circuit 20. As shown, the constant current source 20 includes a voltage divider having a series combination of voltage dividing elements connected across the supply line of the positive bias source 44. The series combination of voltage dividing elements includes a first resistor 46, diode 48, second resistor 50, a further diode 52 and a third resistor 54. The diodes are polarized to insure proper current flow along the voltage divider path. The constant current source further includes a first transistor 56 coupled with its base electrode connected to the junction of resistor 50 and diode 52, and its emitter electrode coupled through a resistance 58 to the lead 38 of the variable rate input device 10. The output of the constant current source is taken from the collector of the transistor 56 and is coupled to the energy storage means 12 along the lead line 60. As was previously described, the energy storage means 12 preferably comprises an RC circuit composed of a resistance 14 and a capacitor 16 series connected across the bias source 44 and having the constant current source output line 60 connected to the junction thereof.

The next stage in the sequence is the differential amplifier 22 which as shown includes a first transistor 62 and a second transistor 64. The emitter electrode of the transistor 62 is coupled through emitter resistance 66 through a common emitter resistance 68 to the high side of the positive bias source 44. The transistor 64 has its emitter electrode connectd through an emitter resistance 70 through the common emitter resistance 68 to the high side of the bias source 44. The base electrode of the transistor 62 is connected to the line 60 from the junction of the resistor 14 and capacitor 16. The collector electrode of the transistor 62 is connected to the line 42, constituting the low side or ground of the positive bias source 44. The collector electrode of the transistor 64 is connected to the indicator 26.

The indicator 26 consists of a smoothing capacitor 72 and a meter movement 74 connected thereacross. It is noted that should indication of the variable rate be all that is desired the output lead 76 shown as emerging from the indicator 26 can be terminated by direct connection to the low side of the positive bias source 44 by a connection to the ground lead 42. If, however, as it is shown on this preferred embodiment, a totalization is desired, then the lead 76 may be extended down to the integrator unit 28 which connects with the trigger unit 30 and the relay and counter units 32 and 34 for providing totalization.

The stage 24 provides a fixed reference source for the differential amplifier 22. As shown in this example, the stage 24 comprises a manually variable potentiometer 78 coupled to the base electrode of the second transistor 64 of the differential amplifier 22.

The variable rate signal appearing along the line 76 is coupled to the integrator 28 which may comprise a capacitor 80. Energization for this portion of the circuit is provided by a negative bias $V_2$, source 82, having its positive terminal coupled to the common groung lead 42 and its negative terminal coupled to a negative bias line 84. Capacitor 80 is coupled between the indicator unit 26 and the negative bias line 84. The signal is taken from across the capacitor unit 80 along the line 86 to the trigger unit 30. Trigger unit 30 consists of a unijunction transistor 88 having its source-drain electrode path coupled between the high side of the positive bias source 44 and the high side of the negative bias source 84 through a first resistance 90 and a second resistance 92. The unijunction transistor 88 is employed to provide a voltage build up through the diode 94 to the transistor circuit consisting of transistor 96 receiving the input signal on its base electrode from the diode 94, an electrolytic capacitor 95 coupling the collector and the base electrodes of the transistor 96 and an emitter resistor 98 coupling the base electrode to the high side of the bias source 82. The output of the transistor unit 96 is provided along the line 100 to the relay unit 32 which may be of the reed variety, The relay unit 32, in turn, when energized provides pulsing to the counter unit 34 for providing totalization of the rate derived from the rate indicator 26. In operation, when the build up on the capacitor 80 is sufficient, the unijunction 88 fires, placing a relatively more positive potential on the base of transistor 96, rendering same conductive. The conductive path formed by the transistor 96 triggers the relay 32, in turn triggering the counter. Adjustment of the voltage across the unijunction 88 will result in adjustment of the firing point of unijunction 88, thereby varying the frequency at which the counter is triggered. Thus, the counter 34 can be calibrated to indicate total distance resulting from the rate shown on the meter 74, as an integral per unit of time.

As described in connection with FIG. 1, the activity monitor 36 is provided to insure that the voltage build up on the capacitor unit 16 does not become excessive in accordance with the demands of the system. The activity monitor consists of an RC network including a resistor 102 and a capacitor 104 connected across the positive bias source 44. At the junction of the resistor 102 and the capacitor 104 a diode 106 receives an input from the variable rate signal input lead 38. The junction point is connected through a further diode 108 to the base electrode of a transistor 110 which has its emitter electrode coupled to the ground lead 42 and its collector electrode directly connected to the junction of the RC circuit formed by resistor 14 and capacitor 16 of the energy storage means 12.

The operation of the circuit just described will now be explained. With regard to the energy storage device 12, the RC circuit of resistor 14 and capacitor 16, connected across the positive bias source, will tend to charge the capacitor 16 up towards the level of the positive bias source. The energy dissipating means 20, including the constant current source formed by the transistor 56, having its base electrode supplied with a fixed voltage level determined by the divider network connected thereto, provides a means for linearly discharging the level of the capacitor 16 by means of the connection 60. However, the constant current source is not rendered operative unless the variable rate input circuit 10 is rendered conductive by means of closure of the switch 10A indicated internally therein which will have the effect of connecting the emitter electrode through resistance 58 to the common ground lead 42. Each time closure of the switch 10A in the variable rate unit 10 is effected, a partial linear discharge of the capacitor 16 will occur. The extend of the discharge of the capacitor 16 will be a direct function of the factors which go into determining the rate at which the switch is opened and closed. If the charge and discharge rate of the capacitor 16 is defined as a complete duty cycle, an operation of the switch 10A over a portion of that duty cycle will result in a proportionate charge level being achieved on the capacitor 16. By employing a constant current source to linearly discharge the capacitor, an accurate DC level will be obtained at the junction of the RC circuit of the energy storage means 12 which can be employed to generate the net voltage level representing the variable rate signal. The signal, appearing on line 60, is introduced directly to the base electrode of the differential amplifier 22. When the signal level exceeds that signal level previously set in by means of the reference source 24, an output rate will be achieved through the collector of the transistor 64. The capacitor 72 will integrate and smooth this output signal and provide a direct reading thereof on the meter movement 74. It is, therefore, apparent that the voltage level on the capacitor 16 builds up in accordance with the open time of the switch 10A rather than switch closure time, and the activity monitor is designed to insure the resultant voltage level increase upon capacitor 16 as a result of switch open time, representing no activity, are prevented. This effect is achieved by arranging the values of the resistor 102 and capacitor 104 to be such that when the discharge rate effected by actuation of the variable rate circuit switch 10A through the diode 106 fails to discharge the level of the capacitor 104 sufficiently, the voltage across the capacitor 104 builds up until the transistor 110 is rendered conductive. Upon rendering the transistor 110 conductive, the voltage across the capacitor 16 discharges, the transistor 62 is forced into saturation as a result of a large potential difference between the emitter and base electrodes, and transistor 64 is cut off. As a result, the current flow through the meter 74 is rapidly reduced to a zero reading.

It should be noted that other ways of calibrating the unit relative to the reference source 24 can be provided. For example, a fixed resistor can be used in place of the potentiometer 78, and the resistors 66 and 70 be scaled to represent the full and zero scale values of current deflection required by the meter over a normal range.

It should also be noted that other forms of circuitry can be employed to perform this specific function noted and that higher accuracy can be achieved by the use of higher precision components or by increased staging in each of the various circuits.

For purposes of illustration, and not intended to be limiting, the following values may be employed for the components illustrated in FIG. 2:

$V_1$ — +6 VOLTS
$V_2$ — −10 VOLTS
$R_{46}$ — 13.5 K.ohms
$R_{50}$ — 33 K.ohms
$R_{54}$ — 13.5 K.ohms
$R_{58}$ — 13.5 K.ohms
$R_{102}$ — 470 K.ohms
$R_{14}$ — 130 ohms
$R_{68}$ — 15 K.ohms
$R_{66}$ — 10 K.ohms
$R_{70}$ — 8.2 K.ohms
$R_{78}$ — 50 K.ohms
$C_{104}$ — 16 MFD
$C_{16}$ — 44 MFD
$C_{72}$ — 100 MFD
$C_{80}$ — 80 MFD
$M_{74}$ — 0–80 UA
$T_{56}$ — 2N708
$T_{110}$ — 2N708
$T_{62}$ — 2N3012
$T_{70}$ — 2N3012
$T_{88}$ — 2N4852
$T_{96}$ — 2N708

Although not shown, system performance can be improved by the use of voltage regulation which prevent any transient voltage caused by the firing of the various components such as the unijunction 88 from varying the designed bias levels. Also, by varying the bias supply to the unijunction, preferably the negative $V_2$ source 82, the counter unit can be adjusted for accurately accumulating a count corresponding to the rate indicated by the meter 74, as explained heretofore. This latter feature finds particular utility in connection with the jogging metering system described in the aforesaid U.S. Pat. No. 3,580,083.

It is also noted that the totalizer system shown can be replaced by an equivalent system which will have the effect of an integrating and totalizing a varying rate signal over a period of time to provide a digital equivalent of a total count. It is also understood that although an AC connection is shown as energizing the counter unit 34 as a result of the connection by the reed relay 32, a DC equivalent can also be employed. Further, the DC equivalent can be employed to operate off the same bias that energized the indicating unit itself.

While in accordance with the provisions of the statutory requirements there has been illustrated and described the best and preferred form of the invention known, it will be apparent to those skilled in the art that changes may be made in the form of the apparatus disclosed without departing from the spirit of the invention and that in certain cases some features of the invention may be used to advantage without corresponding uses of other features.

What is claimed is:

1. A variable rate signal measuring device comprising energy storage means, energizing means coupled to said energy storage means, means for applying a variable rate signal, energy dissipating means activated by said variable rate signal and having a linear dissipation characteristic upon activation, said dissipating means responsive to said variable rate signal for linearly dissipating energy from said energy storage means in accordance with the activation of said variable rate signal and means coupled to said energy storage means for indicating the net energy level of said energy storage means.

2. The combination of claim 1, wherein said energy storage means comprises an RC circuit.

3. The combination of claim 1, wherein said energy dissipating means is a constant current generator, said constant current generator energizable in response to a signal from said means for applying said variable rate signal.

4. A signal rate measuring device comprising means for applying a series of pulses, energy storage means having a maximum charge level, linear energy dissipating means energizable by said means for applying a series of pulses for linearly discharging said energy storage means to a level determined by the rate of said series of pulses, a differential amplifier having a first input responsive to the discharged level of said energy storage means, and a second input responsive to a reference source, said differential amplifier providing an output level indicative of the rate of said series of pulses, and an activity timing means, said activity timing means connected to said energy storage means and said differential amplifier, and responsive to an increase in charge level of said energy storage means beyond a predetermined charge level for reducing said differential amplifier output level to zero.

5. The combination of claim 4 further including means for integrating said output level, and means for digitally accumulating a count corresponding to the integral of said output level over a period of time.

6. The combination of claim 4, wherein said energy storage means comprises an RC circuit.

7. The combination of claim 4, wherein said energy dissipating means is a constant current generator, said constant current generator energizable in response to a pulse applied by said means for applying a series of pulses.

8. A signal rate measuring device comprising a normally charged energy storage means in the form of an RC circuit, a variable rate pulse producing switching means, a constant current generator coupled to said switching means and activated by closure of said switch, said constant current generator coupled to said RC circuit for linearly discharging said RC circuit in accordance with the rate of occurrence of said variable rate pulses to provide a net charge level signal representative of said rate, a differential amplifier, a reference source, said differential amplifier having a first input coupled to said RC circuit and responsive to said net charge level signal, and a second input coupled to said reference source, said differential amplifier providing an output level representing the differential of said net charge level signal above said reference source, indicating means coupled to said differential amplifier for indicating said net charge level signal, and an activity timing means, said activity timing means connected to said energy storage means and said differential amplifier, and responsive to an increase in charge level of said energy storage means beyond a predetermined charge level for reducing said differential amplifier output level to zero.

9. The combination of claim 8 further including integrating means coupled to said indicating means, and means coupled to said integrating means for digitally accumulating a count corresponding to the integral of said output level over a period of time.

10. The combination of claim 8, wherein said constant current generator comprises a transistor, means for applying a fixed potential to the base electrode of said transistor, means coupling the emitter electrode of said transistor to said switching means for periodic activation of said transistor by said switching means, and means coupling the collector electrode of said transistor to said RC circuit.

11. The combination of claim 8, wherein said activity timing means comprises a further normally charged RC circuit, and a second transistor, means coupling said RC circuit to said switching means for discharging said further RC circuit at a rate corresponding to the rate of actuation of said switching means, said second transistor responsive to a build up of charge on said further RC circuit above a predetermined limit for switching from a non-conductive to a conductive condition, said further transistor coupled across the storage element of said RC circuit of said energy storage means to completely dissipate the charge therein in response to the conductive state of said further transistor.

* * * * *